(12) United States Patent
Win (10) Patent No.: US 7,513,548 B1
(45) Date of Patent: Apr. 7, 2009

(54) TRUCK LOAD STORAGE APPARATUS

(76) Inventor: Joseph T. S. Win, 126 W. Lemon Ave., Arcadia, CA (US) 91007

( * ) Notice: Subject to any disclaimer, the term of this patent is extended or adjusted under 35 U.S.C. 154(b) by 444 days.

(21) Appl. No.: 11/409,693

(22) Filed: Apr. 25, 2006

(51) Int. Cl.
*B60P 9/00* (2006.01)
(52) U.S. Cl. .......................................... 296/3; 224/405
(58) Field of Classification Search .................. 296/100, 296/3, 40, 224; 188/300; 267/289; 224/405
See application file for complete search history.

(56) References Cited

U.S. PATENT DOCUMENTS

| | | | |
|---|---|---|---|
| 2,997,330 A | | 8/1961 | Boultinghouse |
| 3,765,713 A | * | 10/1973 | Suitt ............................. 296/3 |
| 4,531,775 A | | 7/1985 | Beals |
| 5,009,457 A | | 4/1991 | Hall |
| 5,110,021 A | * | 5/1992 | Dawson, Jr. ................ 224/405 |
| 5,476,301 A | * | 12/1995 | Berkich ......................... 296/3 |
| 5,806,905 A | * | 9/1998 | Moore ............................ 296/3 |
| 6,224,140 B1 | | 5/2001 | Hoplock |
| 6,446,997 B1 | * | 9/2002 | Bergman et al. ......... 280/414.3 |
| 6,607,229 B1 | | 8/2003 | McIntosh |
| 6,799,784 B2 | | 10/2004 | Rios |
| 7,246,839 B1 | * | 7/2007 | Nyberg .................. 296/100.06 |

* cited by examiner

*Primary Examiner*—Dennis H Pedder
*Assistant Examiner*—Pinel E Romain
(74) *Attorney, Agent, or Firm*—William W. Haefliger (57) ABSTRACT

Load storage enhancement apparatus for a truck having a rear storage platform or bed, the combination comprising two extension walls that have generally horizontally stored positions over the platform and generally upright extended positions projecting above opposite sides of the platform, framework attached to the walls in their upright positions, the framework including members extending laterally and supported by the walls at locations spaced both lengthwise and widthwise of the upright walls, the members blocking tilting of the walls, and mechanism resisting pivoting of the walls in upright positions. Elongated carrier structure is adjustably movable between extended position over a truck cab, and retracted position over the truck bed, to be locked in either or both of such positions. Carrier structure guides on the walls move with the walls between upright and lowered positions.

22 Claims, 7 Drawing Sheets

TRUCK LOAD STORAGE APPARATUS

BACKGROUND OF THE INVENTION

This invention relates generally to enhancing the load carrying capacity of open flat bed type trucks, and more particularly to improvements in support structure that can rapidly be placed in extended position, over truck flat beds, to carry auxiliary loads at positions elevated above the flat beds.

There is need for the above noted improvements to provide sturdy, reliable and easily assembled extender structure above truck flat beds, to support loads. No prior structure of which I am aware provides the unusually advantageous combinations of structural elements, functions of such elements, and improved results as are provided by the present invention.

SUMMARY OF THE INVENTION

It is a major object of the invention to provide improved load support structure meeting the above need, with support walls easily movable between stored and extended stable positions. Basically the invention is embodied in load storage enhancement apparatus for a truck having a rear storage platform, or bed, the combination comprising a) two extension walls that have generally horizontally stored positions over the platform and generally upright extended positions projecting above opposite sides of the platform, b) framework attached to the walls in such upright positions, the framework including members extending laterally and supported by the walls at locations both lengthwise and widthwise of the upright walls, such members blocking tilting of the walls, c) and mechanism supporting the walls in such upright positions.

It is a further object of the invention to provide first elements defining receptacles and second elements defining plungers, said elements carried by the walls and members to interfit, with the receptacles receiving the plungers, to enable the members to block wall tilting. Typically, the first elements are carried at dual locations by the walls, and the second elements are carried at dual locations at or proximate opposite ends of the members.

An added object is the provision of mechanism, as referred to, that include multiple devises pivotally supported at locations to pivot with the walls, with springs operatively connected to the devises to hold them in upright position in extension wall extended positions. Typically, the springs exert forces in directions offset from pivot locations, to resist pivoting of the upright walls toward downward stored positions. Also the springs preferably comprise compression springs, there being links receiving compression forces from the springs, the links connected to the devises to transmit force to the devises in such offset directions, relative to the pivot locations, to provide stability.

Another object comprises provision of adjusters operatively coupled to the springs to adjust spring compression, and wall stability. As will be seen, spring housings are connected to the pivotable walls, and the adjusters comprise rotatably adjustable pushers having threaded coupling to said housings.

An added object is to provide pivotable walls, as referred to, wherein tubing is provided to define lengthwise and widthwise wall frames.

A yet further object is to provide hinges connecting the extender walls to truck structure, said hinges defining parallel hinging axes whereby the opposite side extender walls pivot upwardly and away from one another into said extended positions. Hinge axes may be located above the tops of the truck platform, whereby loading imposed by and from said extender walls is transferred to truck structure.

Another object includes locating the forwardmost one of the cross members to extend proximate the truck cab, to support horizontal loads extending over the cab.

A yet further object is to provide longitudinally forwardly elongated load carrier structure supported by the walls for longitudinal displacement between extended and retracted positions, the truck having a cab, and said carrier structure projecting forwardly over the cab in said extended position.

As will be seen, forwardly extending guides may be provided and carried by the walls to extend in forwardly and rearwardly guiding relative to said load carrier structure.

Additionally, a load may be carried by the carrier structure, in its forwardly extended position, to project over the truck cab, the load also extending rearwardly over the truck rear storage platform.

Yet another object includes provision of auxiliary frame work extending laterally and connected to laterally spaced carrier structure rails that are guided by said guides.

A further object includes provision of upper and lower spring units operatively connected to such walls to pivot therewith and to absorb vertical loads transmitted via said walls, during pivoting, thereby easing such pivoting. These are useful when heavy loads are exerted, and transmitted by the pivoting walls.

Another object includes provision of angled braces operatively connected to said members and to said walls, to resists tilting of the walls. Both the members and braces may have down—turned ends removably received in receptacles that are carried by the walls. Lock means may be provided for locking the carrier structure in a selected positions, longitudinally.

These and other objects and advantages of the invention, as well as the details of an illustrative embodiment, will be more fully understood from the following specification and drawings, in which:

DETAILED DESCRIPTION

Figure 1:
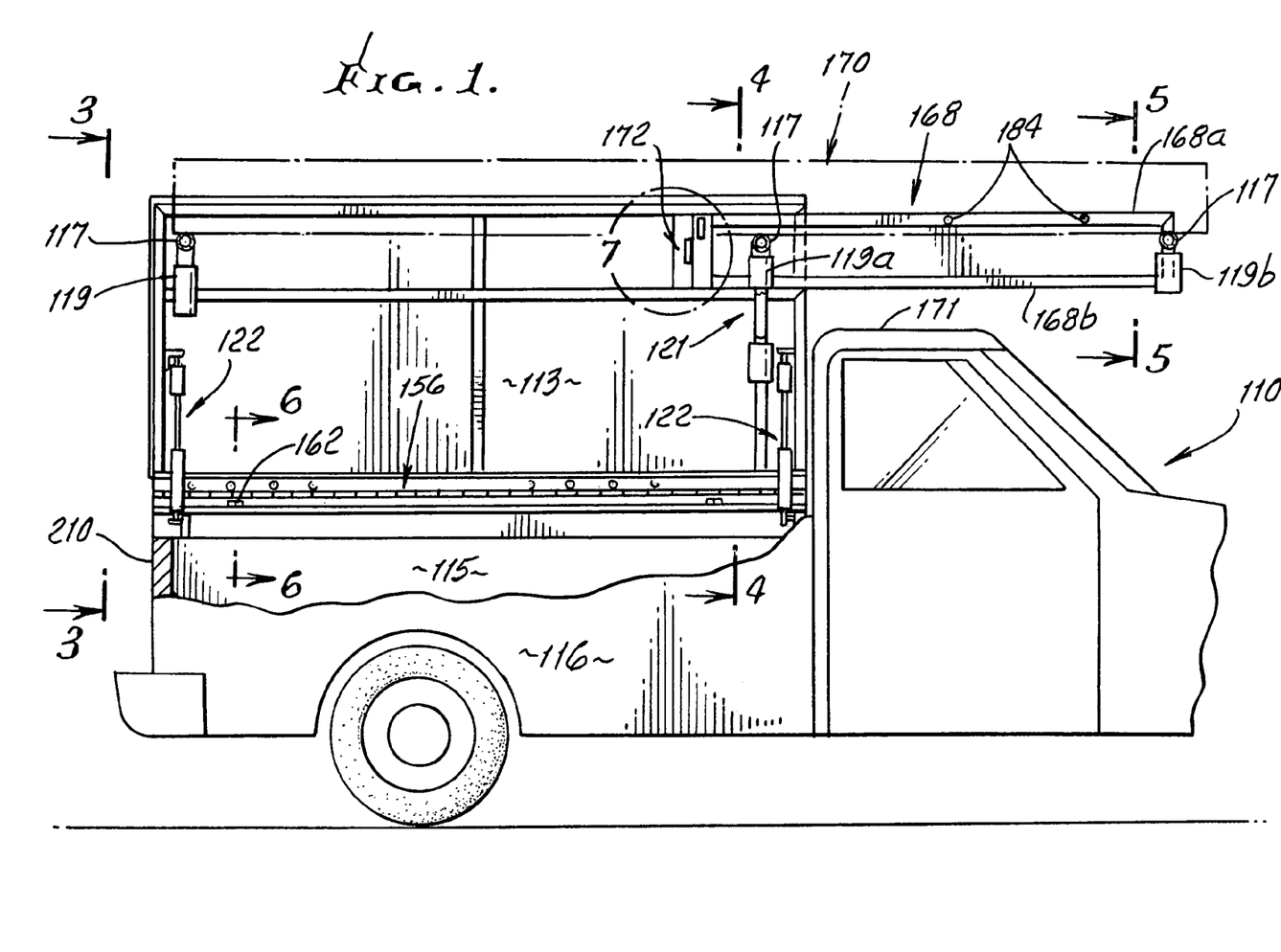
FIG. 1 is a side view showing installation of the apparatus on a truck having a cab, with forwardly extensible load carrier structure displaced to extend over the cab.
Figure 2:
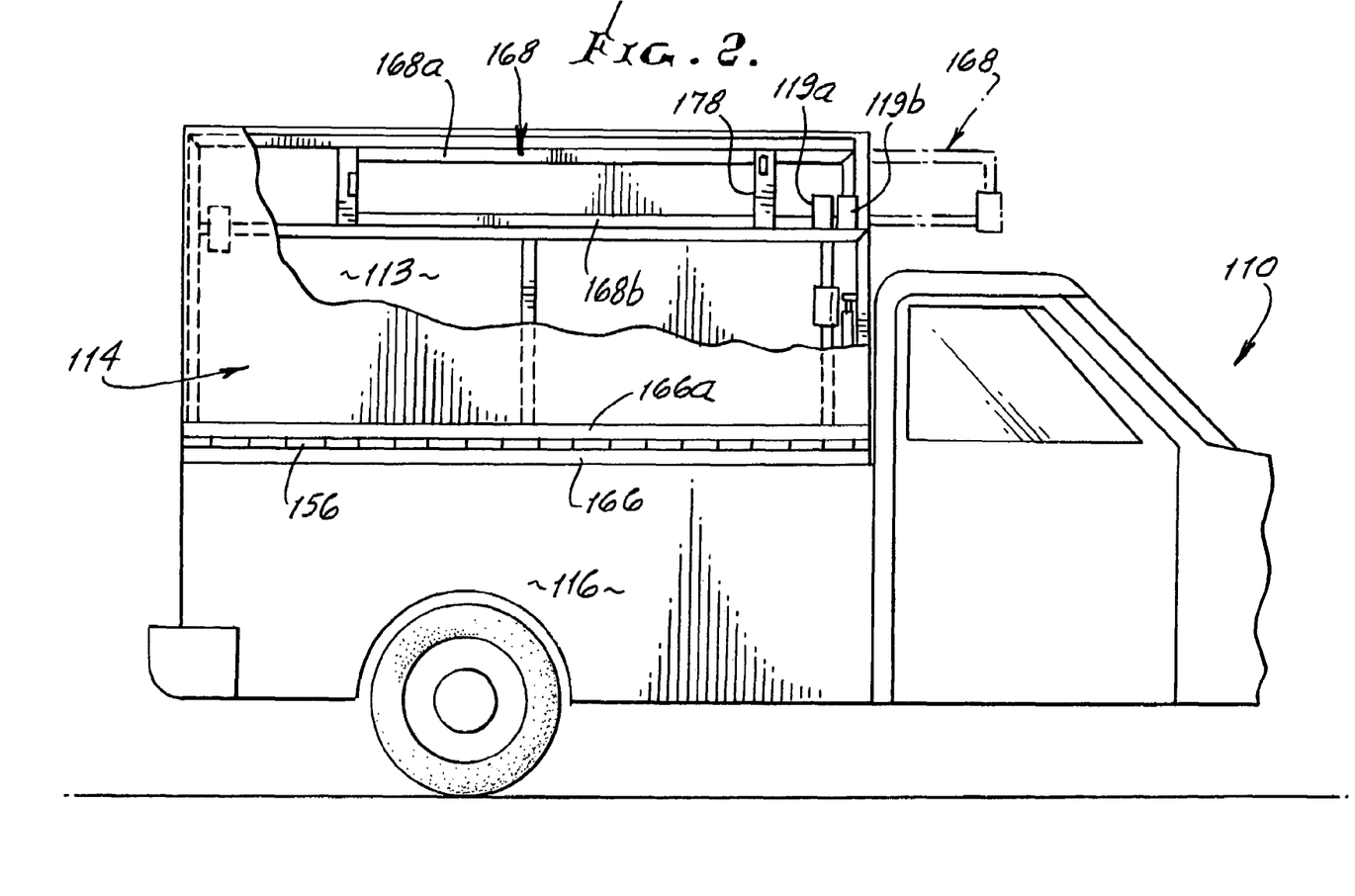
FIG. 2 is a view like FIG. 1, showing the carrier structure in retracted position.
Figure 3:
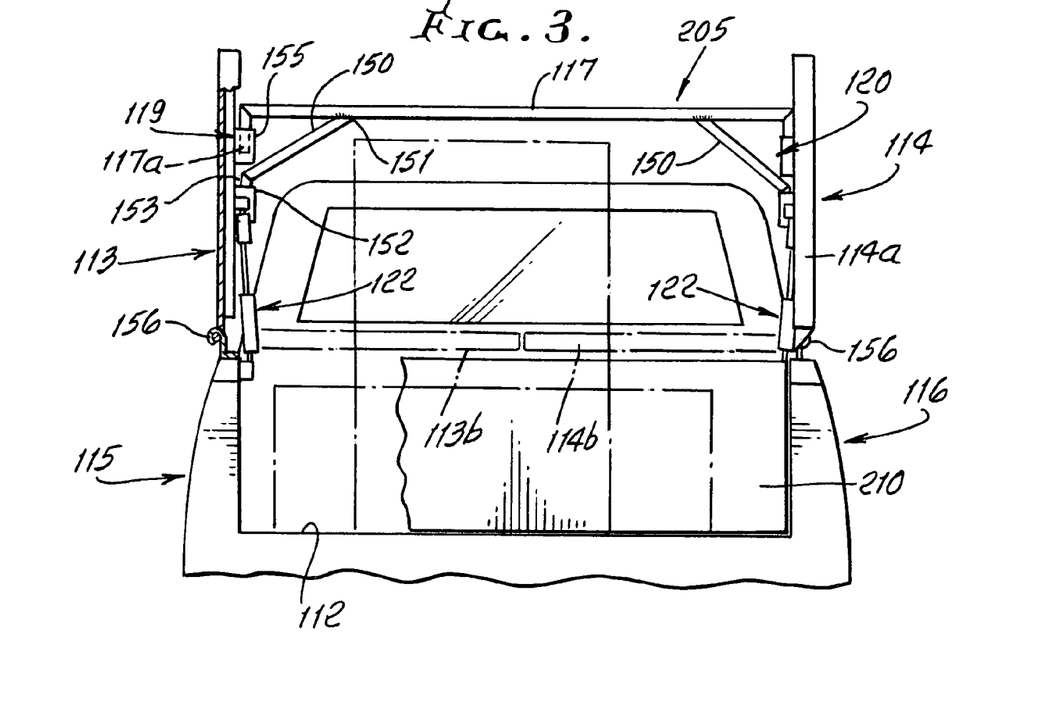
FIG. 3 is an end view taken on lines 3-3 of FIG. 1.
Figure 4:
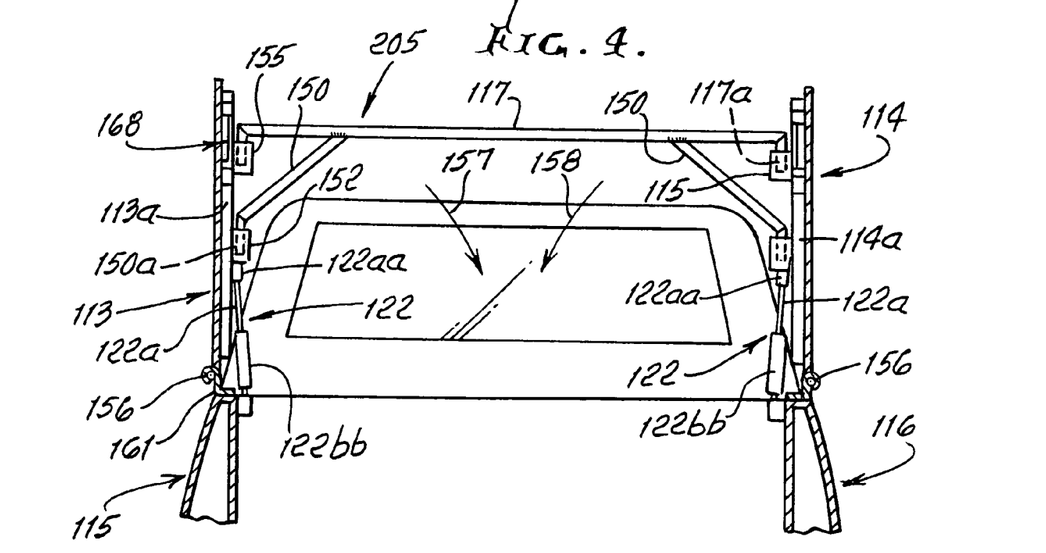
FIG. 4 is a vertical section taken on lines 4-4 of FIG. 1.

In the apparatus seen in FIGS. 1-3, a truck 110 has a rear storage platform or bed 112. Mounted on the truck are:

a) two extension walls or panels 113 and 114 that have stored or lowered horizontal positions, as at 113b and 114b, as seen in FIG. 3, and generally upright, extended positions as seen at 113a and 114a in FIGS. 1-4, projecting above the opposite side walls 115 and 116 of the truck platform, and above the level of tail gate 210;

b) framework 205 releasably attached to the walls 113 and 114 in their upright positions, as seen in FIGS. 3 and 4, the framework including elongated members 117 extending laterally and supported at their opposite ends by the raised walls 113 and 114, at left and right connection locations 119, 119a spaced lengthwise of the upright walls and blocking tilting of those walls 113 and 114;

c) and mechanism 121, which may include dual spring units 122, acting to support the walls 113 and 114 during pivoting.

Figure 6:
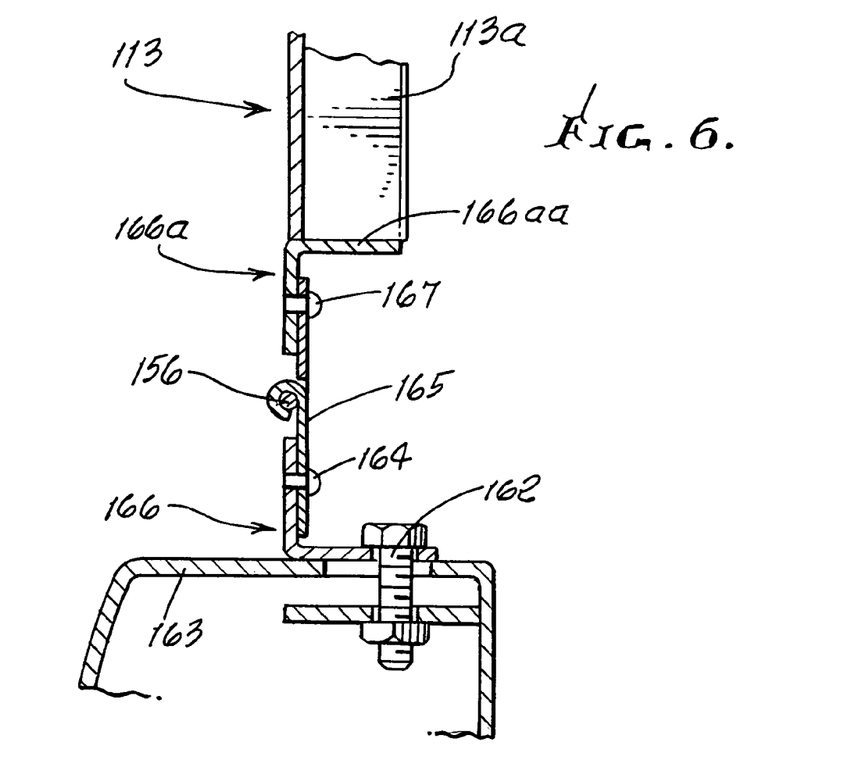
FIG. 6 is an enlarged fragmentary section taken on lines 6-6 of FIG. 1.

The upper and lower springs such as gas or air spring units including pistons, 122 and 122a act to cushion tilting displacement of the walls 113 and 114, as during wall displacement between raised and lowered positions. Upper units 122aa exert lesser force and lower units 122bb exert greater force, as during lowering of the walls. Sideward displacement of the raised walls is blocked by angled braces 150 connected to the members 121, at locations 151, and to the connection components 152 at locations 153. Dual bracing is thereby provided at each end of the member 117, for rigidizing the framework. Components 152 are attached to frame parts 113a and 114a associated with the walls. Struts 122a of the spring units are operatively connected to spring parts such as pistons in housings 122aa and 122bb. Housings 122bb are attached, via pivots to the truck walls, whereas housings 122aa are attached via pivots to the walls 113 and 114. When downturned ends 117a of the cross members 117 are upwardly removed from receptacles 155, and downturned ends 150a of the braces are removed from receptacles 159, the walls 113 and 114 can be swung inwardly and downwardly on hinges 156, toward the truck bed, exerting loading on the dual spring units. The force of the spring units may be overcome, in such wall folding, as by over-center action. See arrows 157 and 158 in FIG. 4. The hinges are in turn connected to truck structure indicated at 161 in FIGS. 4 and 6. Note in FIG. 6 the L-bracket 166 bolted at 162 to truck panel 163, and fastened at 164 to a hinge plate 165. L-bracket 166a in FIG. 6 is fastened at 167 to hinge plate 165a and extends at 166aa to support the swingable wall 113a and frame 113a associated with 113.

Figure 5:
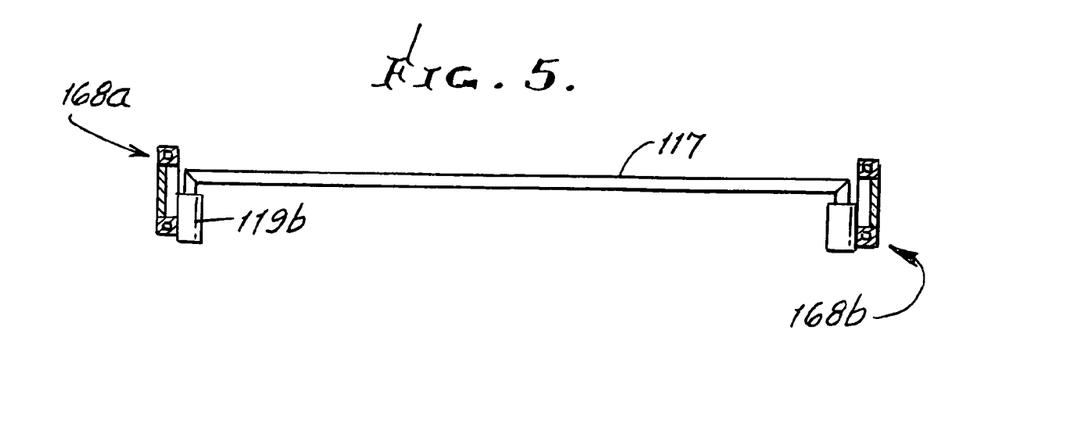
FIG. 5 is a vertical section taken on lines 5-5 of FIG. 1.

FIGS. 1, 2 and 5 illustrate the provision of a forwardly elongated load carrier structure 168 supported by the walls 113 and 114 for longitudinal displacement between extended and retracted positions, the truck having a cab, and the carrier structure projecting forwardly over the cab in said extended position. Note also carriage connection 119b to a forward cross member 117.

See FIG. 1 forwardly extended position of 168, and FIG. 2 retracted position thereof. A load 170 carried by 168 projects over the top 171 of the cab, as shown, and in which position a lock device or locks 172 serve to lock the structure to a wall 113 or walls 113 and 114, or the associated frames 113a and 114a.

Figure 7:
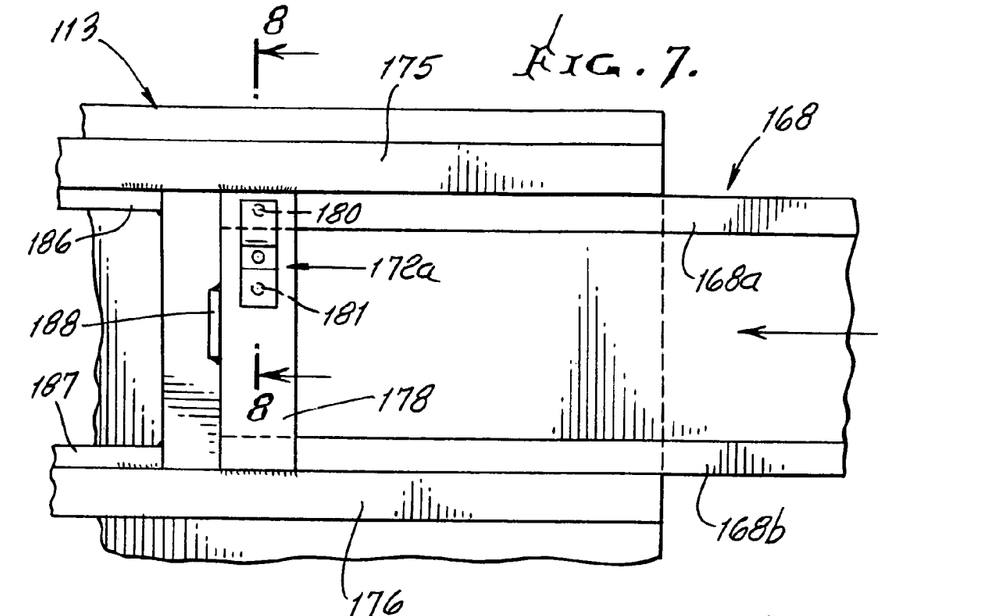
FIG. 7 is an enlarged fragmentary section taken on lines 7-7 of FIG. 1.
Figure 8:
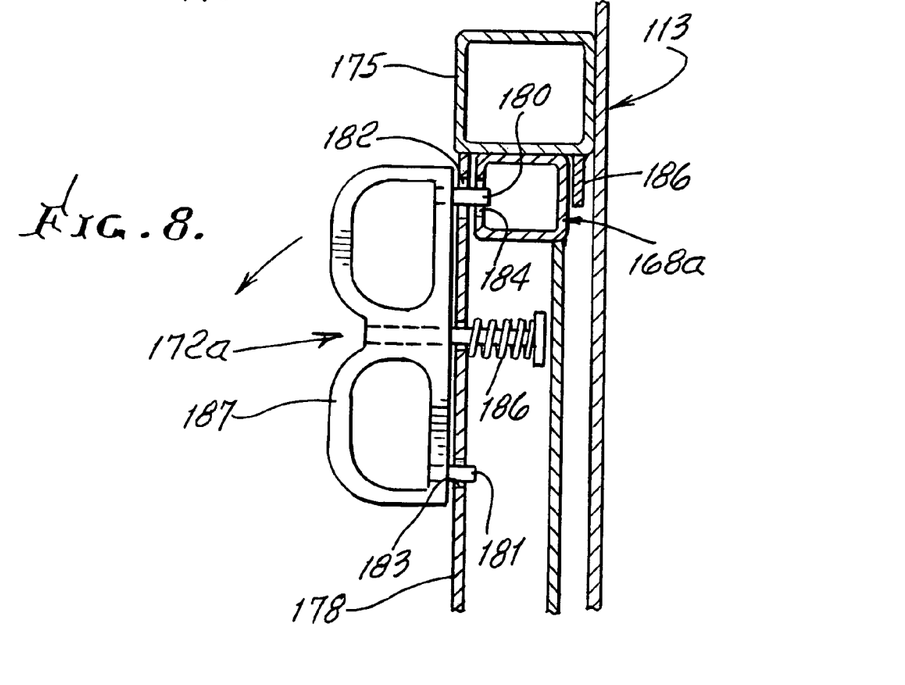
FIG. 8 is a section taken on lines 8-8 of FIG. 7.

Referring to FIGS. 7 and 8, a highly advantageous lock device is indicated at 172a. Structure 168 includes upper and lower elongated rails 168a and 168b that can be extended and retracted, between elongated upper and lower frames 175 and 176. Wall 113 is attached to those frames, and wall 117 is likewise attached to frames 175 and 176 at the opposite side of the truck bed. Panel 178 is attached to frames 175 and 176. When the structure 168 slides into extended i.e. forward position, as shown, the lock 172a is operable to lock 168 in position. Lock 172a includes dogs 180 and 181 that fit through holes 182 and 183 in 178, and into keeper hole 184 in rail 168a. A compression spring 186 urges a handle 187 to the right, in FIG. 8, keeping dog 186 in locking position in 168a. When rearward retraction of the structure 168 is desired, handle 187 is pulled to the left, releasing dog 180 from rail 168a, allowing retraction. A stop is provided at 188 on 168 to stop frame endwise retraction.

Rails 168a and 168b at each side of structure 168, are seen in FIG. 5, and slide between guides or guide flanges 186 and 187 attached to 175. See FIG. 8. FIG. 2 shows a mid-position of structure 168. Locking holes 184 can be provided at selected positions along rail 168a, for reception of the locking dogs, to position structure 168 endwise, relative to the truck cab top.

Figure 9:
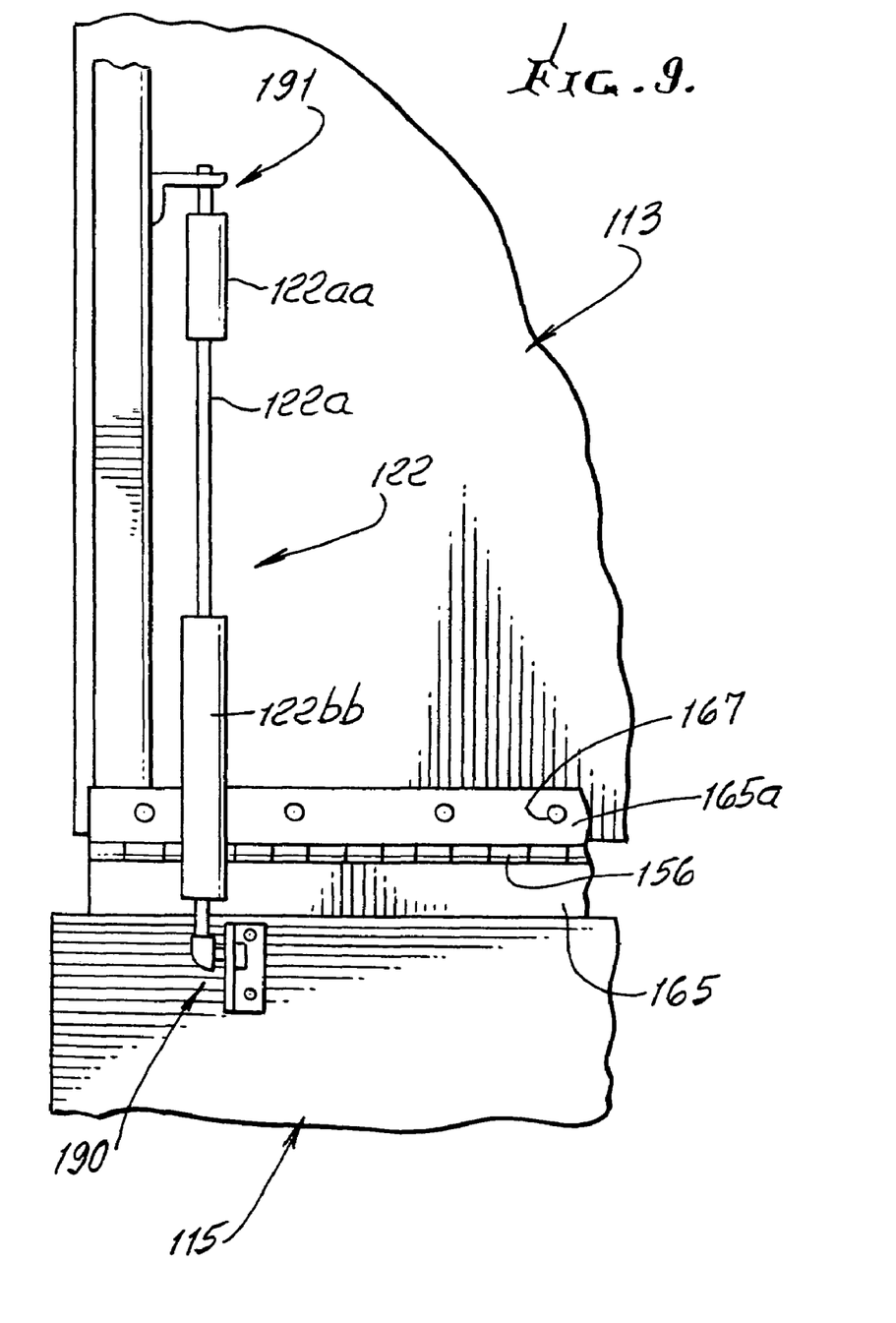
FIG. 9 is a fragmentary section showing spring unit connection to a truck body and a hinged lid, in upright position.

FIG. 9 shows pivotal attachment of a spring unit lower end to the truck body at 190 and of the spring unit upper end at 191 to the wall 113, to pivot therewith. The heavier spring in 122bb provides greater resistance to tilting of the wall 113 than the lighter spring in 122aa, the combined springs cushioning wall tilting throughout its excursion.

Figure 10:
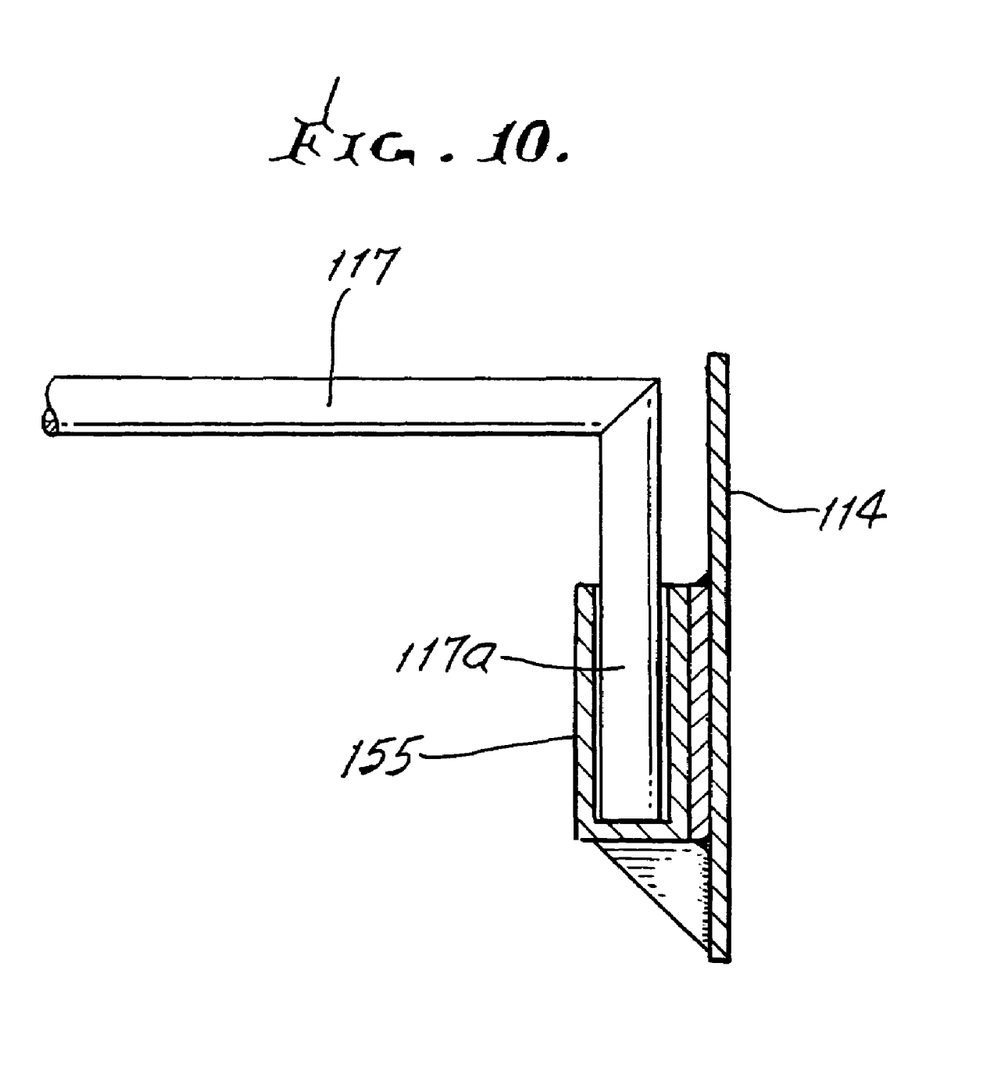
FIG. 10 shows removable interconnection of a frame member to a raised side wall.

In FIG. 10, a frame member 117 has a downturned end 117a removably downwardly received in a receptacle 155 attached to wall 114.

I claim:

1. Load storage enhancement apparatus for a truck having a rear storage platform or bed, the combination comprising:
   a) two extension walls that have generally horizontally stored positions over the platform and generally upright extended positions projecting above opposite sides of the platform,
   b) framework attached to the walls in said upright positions, said framework including members extending laterally and supported by the walls at spaced locations both lengthwise and widthwise of the upright walls, said members blocking tilting of the walls,
   c) and mechanism supporting the walls in said upright positions,
   d) there being angled braces operatively connected to said members and to said walls, to resist tilting of the walls,
   e) and including upwardly opening receptacles carried by said walls, and wherein both said members and said braces have down-turned ends removably received in said receptacles,
   f) and there being carrier structure having fixed undirectional length at all times and supported for longitudinal displacement between forwardly extended and rearwardly retracted positions, and including longitudinally extending rails located for said longitudinal displacement sidewardly proximate certain of said receptacles.

2. The combination of claim 1 wherein the receptacles are carried at dual locations by the walls, and the down turned ends are carried at dual locations at or proximate opposite ends of the members.

3. The combination of claim 1 wherein said mechanism includes multiple housings pivotally supported at locations to pivot with the walls, and spring means associated with the housings to hold them in upright positions in wall extended positions.

4. The combination of claim 3 wherein the spring means exert forces in directions to resist pivoting of the walls toward stored positions.

5. The combination of claim 4 wherein said spring means comprise air springs, there being links receiving compression force from the springs, the links positioned to transmit force in offset directions, relative to said pivot locations.

6. The combination of claim 5 including adjusters operatively coupled to the spring means to adjust spring compression.

7. The combination of claim 4 wherein the spring means include upper and lower air spring housings, the upper air springs exerting relatively lesser force, and the lower air springs exerting relatively greater force during spring cushioned movement of the extension walls toward stored positions.

8. The combination of claim 1 including hinges connecting said walls to truck structure, said hinges defining parallel hinge axes whereby the walls pivot upwardly and away from one another into said extended positions.

9. The combination of claim 8 wherein the spring means exert forces in directions offset from said pivot locations, to resist free pivoting of the walls toward stored positions, and wherein said hinge axes are located above the top level of said truck platform, whereby loading imposed by and from said walls is transferred to said truck structure.

10. The combination of claim 1 including tubing defining lengthwise and widthwise wall frames.

11. The combination of claim 1 including said truck having a cab, the forwardmost one of said members extending proximate the truck cab, to support horizontal loads extending over the cab.

12. The combination of claim 1 including connection plates removably connecting the walls to said mechanism.

13. The combination of claim 3 wherein said mechanism includes dual pivots and dual brackets.

14. The combination of claim 1 wherein the truck has a cab, and said carrier structure projects forwardly over the cab in said extended position.

15. The combination of claim 14 including forwardly extending guides carried by said walls and extending in forwardly and rearwardly guiding relation to said load carrier structure, said guides being pivotable with the walls toward wall horizontally stored position.

16. The combination of claim 14 including a load carried by said carrier structure in its forwardly extended position, to project over the truck cab, said load also extending rearwardly over said truck rear storage platform.

17. The combination of claim 14 wherein said mechanism include upright dual spring units operatively connected to said walls to pivot therewith and to absorb vertical loads transmitted via said walls.

18. The combination of claim 1 wherein said mechanism includes upper and lower spring units operatively connected to said walls to pivot therewith and to absorb vertical loads exerted by said walls, as during wall pivoting.

19. The combination of claim 14 including hinges supporting said walls for swinging movement, said hinges connected to truck structure.

20. The combination of claim 1 including hinges supporting said walls for swinging movement, said hinges connected to truck structure.

21. The combination of claim 14 including lock means for locking said carrier structure in a selected position or positions, longitudinally.

22. The combination of claim 21 wherein said lock means include a lock dog receivable in an opening defined by a carrier structure rail.

* * * * *